(12) United States Patent
Kumabe et al.

(10) Patent No.: US 10,104,678 B2
(45) Date of Patent: Oct. 16, 2018

(54) WIRELESS COMMUNICATION DEVICE

(71) Applicant: DENSO CORPORATION, Kariya, Aichi-pref. (JP)

(72) Inventors: Seigou Kumabe, Kariya (JP); Takahisa Yamashiro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/756,992

(22) PCT Filed: Aug. 22, 2016

(86) PCT No.: PCT/JP2016/074309
§ 371 (c)(1),
(2) Date: Mar. 2, 2018

(87) PCT Pub. No.: WO2017/038515
PCT Pub. Date: Mar. 9, 2017

(65) Prior Publication Data
US 2018/0249478 A1   Aug. 30, 2018

(30) Foreign Application Priority Data

Sep. 4, 2015 (JP) ................................ 2015-175078

(51) Int. Cl.
*H04W 72/10* (2009.01)
*H04W 4/40* (2018.01)
(Continued)

(52) U.S. Cl.
CPC ............. *H04W 72/10* (2013.01); *H04W 4/40* (2018.02); *H04W 4/80* (2018.02); *H04W 64/00* (2013.01); *H04W 72/0453* (2013.01)

(58) Field of Classification Search
CPC ..................................................... H04W 72/10
See application file for complete search history.

(56) References Cited

U.S. PATENT DOCUMENTS 8,462,704 B2   6/2013   Hu
8,761,676 B2   6/2014   Hu et al.
(Continued)

OTHER PUBLICATIONS

"IEEE Standard for Wireless Access in Vehicular Environments (WAVE)—Networking Services", IEEE Vehicular Technology Society, IEEE Std 1609.0 2010, Dec. 30, 2010.

*Primary Examiner* — Mazda Sabouri
(74) *Attorney, Agent, or Firm* — Harness, Dickey & Pierce, P.L.C.

(57) ABSTRACT

A wireless communication device includes a short range receiving unit, a channel control unit for controlling a setting of a reception channel of the short range receiving unit to a control channel or a service channel, and an execution service determination unit. The channel control unit sets the reception channel as the control channel during a control channel time frame, and maintains the reception channel as the control channel during an extension time frame even after the short range receiving unit receives the service start information. The execution service determination unit performs an execution service determination process for determining, as an execution service, a service having the highest priority out of the services indicated by the service start information received by the short range receiving unit while the reception channel is set as the control channel by the channel control unit.

9 Claims, 12 Drawing Sheets

(51) Int. Cl.
*H04W 72/04* (2009.01)
*H04W 64/00* (2009.01)
*H04W 4/80* (2018.01)

(56) References Cited

U.S. PATENT DOCUMENTS

| | | | |
|---|---|---|---|
| 2005/0002362 A1* | 1/2005 | Kim | H04N 21/43615 370/336 |
| 2011/0306353 A1* | 12/2011 | Kim | H04W 48/18 455/452.2 |
| 2017/0180939 A1* | 6/2017 | Kulkarni | H04W 4/025 |

* cited by examiner

| Index | WSA | | | | | RECEPTION TIME |
|---|---|---|---|---|---|---|
| | PSID | PRIORITY | OPTION INFO | CHANNEL | ... | |
| 1 | 10 | 5 | — | SCH1 | | t1(hh:mm:ss:xxx) |
| 2 | 20 | 2 | extend | SCH4 | | t2(hh:mm:ss:yyy) |
| 3 | 14 | 1 | — | SCH5 | | t6(hh:mm:ss:zzz) |

| HEADER | PSID | PRIORITY | OPTION INFO | CHANNEL INFO | DATA SIZE | · · · |

WIRELESS COMMUNICATION DEVICE

CROSS REFERENCE TO RELATED APPLICATIONS

This application is a U.S. National Phase Application under 35 U.S.C. 371 of International Application No. PCT/JP2016/074309 filed on Aug. 22, 2016 and published in Japanese as WO 2017/038515 A1 on Mar. 9, 2017. This application is based on and claims the benefit of priority from Japanese Patent Application No. 2015-175078 filed on Sep. 4, 2015. The entire disclosures of all of the above applications are incorporated herein by reference.

TECHNICAL FIELD

The present disclosure relates to a wireless communication device, and more particularly to a wireless communication device that communicates through two types of channels including a control channel and a service channel.

BACKGROUND ART

Up to now, as disclosed in Patent Literature 1, WAVE (Wireless Access in Vehicular Environments) has been known as a communication standard used for an intelligent transport system. In the WAVE, a vehicle wireless communication device and a roadside device communicate with each other with the use of two kinds of channels, that is, a control channel and a service channel.

A service channel is a channel used for transmitting and receiving information for executing a service (hereinafter, service execution information). There are multiple types of services, and the service channels also have multiple channels having different frequencies from each other. Each service is associated with one of the multiple service channels.

The control channel is a channel used for transmitting various kinds of information (hereinafter, service start information) required to be notified in order that the roadside device starts a communication with the vehicle wireless communication device with the use of the service channel. In order to start the communication using the service channel, there is a need to set a channel (hereinafter referred to as a reception channel) to be used for reception by the vehicle wireless communication device as one of the service channels. For that reason, the service start information includes information that defines the service channel to be set for the reception channel.

In the WAVE, a time period is divided into a control channel time frame and a service channel time frame. The control channel time frame is a time frame in which the vehicle wireless communication device uses the reception channel as the control channel unless a command to change the service channel time frame is notified by the service start information. On the other hand, the service channel time frame is a time frame for periodically setting the reception channel to the service channel while a communication using the service channel is being performed.

Until the vehicle wireless communication device receives the service start information, the vehicle wireless communication device sets the reception channel to the control channel in not only the control channel time frame but also in the service channel time frame. On the other hand, in the case of receiving the service start information, the vehicle wireless communication device sets the reception channel to the service channel from the first service channel time frame after receiving the service start information. Thereafter, until the communication for executing the service is completed normally, the vehicle wireless communication device sets the communication channel as the service channel designated by the service start information in the service channel time frame, and sets the communication channel as the control channel in the control channel time frame.

In addition, the service start information includes information indicating a priority of the service. Suppose that certain service start information has been received while the reception channel is set as the control channel and thereafter another service start information designating another service has been received before a start of the service channel time frame. In this case, out of the services designated by the service start information received during the control channel time frame, the service high in the priority is executed.

PRIOR ART LITERATURE

Patent Literature

Patent Literature 1: U.S. Pat. No. 8,462,704

SUMMARY OF INVENTION

It is an object of the present disclosure to provide a wireless communication device capable of preventing an execution failure of communication for executing a service high in priority.

According to an aspect of the present disclosure, a wireless communication device includes a short range receiving unit, a channel control unit, and an execution service determination unit. The short range receiving unit sets a reception channel to a channel selected from a control channel and a plurality of service channels. The control channel and the plurality of service channels have different frequencies from each other. The short range receiving unit receives, from a service providing station, service start information while the reception channel is set to the control channel. The service start information includes information defining a type of a service, service priority information defining a priority of the service, and information defining a service channel of the service. The short range receiving unit receives, from the service providing station, service execution information which is information for execution of the service while the reception channel is set to the service channel. The channel control unit controls a setting of the reception channel to the control channel or to the service channel. A time frame is divided alternately into a control channel time frame and a service channel time frame under a reference time division. The reception channel is set to the control channel during the control channel time frame and the reception channel is set to the service channel during the service channel time frame. The channel control unit sets the reception channel as the control channel during the control channel time frame. When the short range receiving unit receives the service start information related to a standard start service during the control channel time frame, the channel control unit maintains the reception channel as the control channel for an extension time frame after a reception of the service start information. The extension time frame is defined as a predetermined number of the service channel time frames. The standard start service is a service which requires the reception channel is set to the service channel from a beginning of the service channel time frame. The execution service determination unit sets a part or all of the service start information received by the short range receiving unit as service start information for comparing priorities while the reception channel is set to the control channel. The execution service determination unit determines the service having a highest priority among the services indicated by the service start information for comparing priorities based on the service priority information included in the service start information. The execution service determination unit performs an execution service determination process in which the service determined to have the highest priority is set as an execution service. When the execution service determination unit determines the standard start service as the execution service, the channel control unit sets the reception channel to the service channel according to the service start information of the execution service from a beginning of a next service channel time frame after the extension time frame has elapsed. The execution service determination unit receives the service execution information using the service channel.

Up to now, in the case of receiving the service start information, the reception channel is set to the service channel from the subsequent first service channel time frame. However, in the present disclosure, the channel control unit maintains the reception channel as the control channel for a preset number of service channel time frames even after receiving the service start information. Therefore, when the service start information is transmitted from the service providing station during the preset number of service channel time frames, the short range receiving unit is capable of receiving the service start information.

In the present disclosure, the execution service determination unit may set, as service start information for comparing priorities, a part or all of the service start information received while the short range receiving unit uses the reception channel as the control channel. Then, the execution service determination unit determines, as the execution service, the service having the highest priority among the services indicated by the service start information for comparing the priorities. The channel control unit sets the service channel corresponding to the execution service as the reception channel. Therefore, execution failure of the communication for executing the service having the high priority can be prevented.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

As long as a reception channel is set as a control channel, multiple service start information can be received. However, service start information cannot be received after a service to be executed is determined and the reception channel is set as a service channel. For that reason, while the reception channel is set as a service channel, even if the service start information on a service having the higher priority than a service using the service channel is transmitted from a roadside device, a vehicle wireless communication device cannot receive the service start information.

As a result, there may be cases where a communication for executing a service with a high priority cannot be performed even though the priority of the service is preliminarily set.

Further, when a wireless communication device having the same function as that of the vehicle wireless communication device is used in a mobile object other than a vehicle, and when a device communicating with the wireless communication device (hereinafter referred to as a service providing station) is a device other than a roadside device, the same difficulty occurs.

The present disclosure has been made on the basis of the circumstances described above, and an object of the present disclosure is to provide a wireless communication device capable of preventing an execution failure of a communication for executing a service high in priority.

First Embodiment

Figure 1:
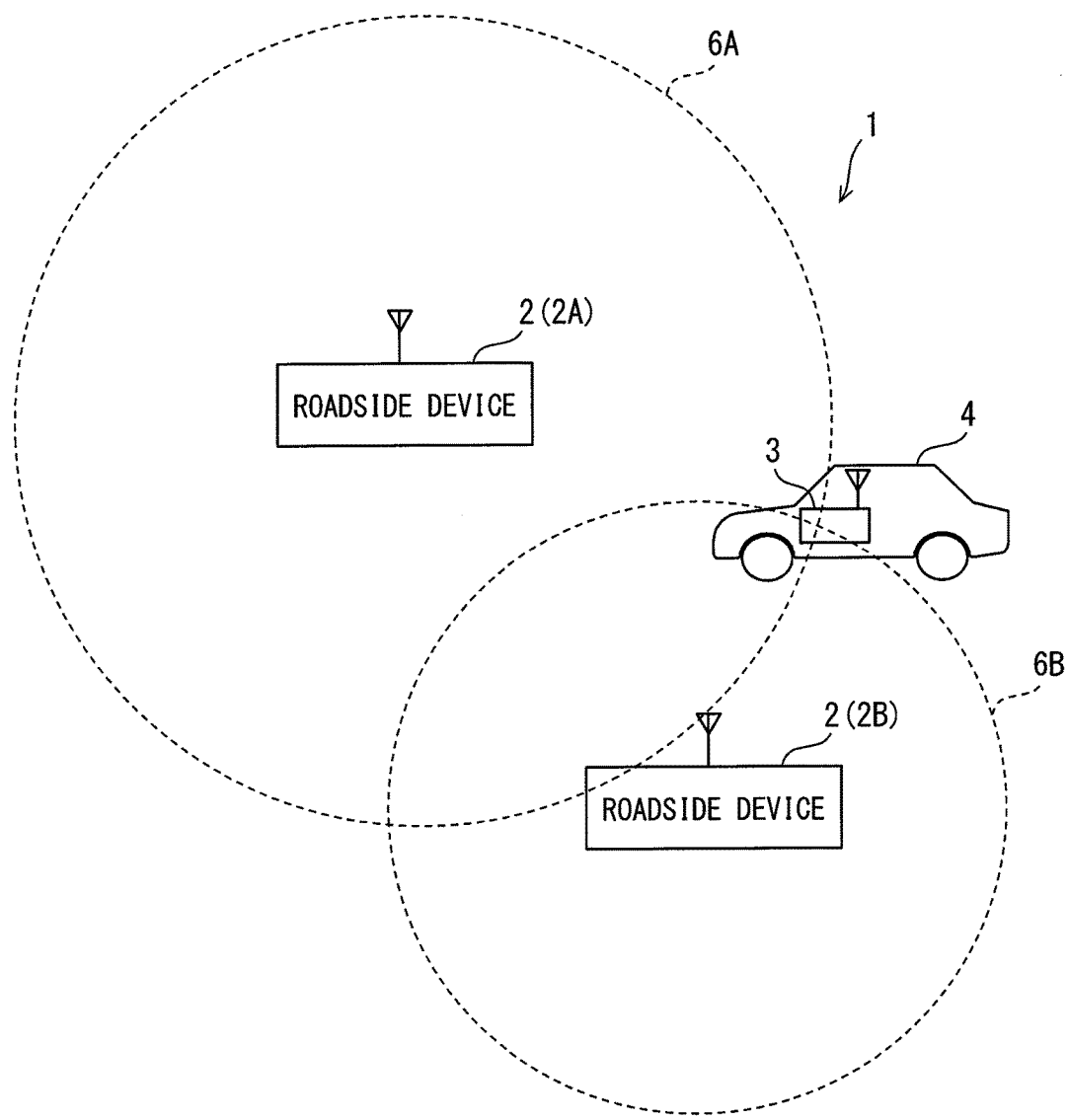
FIG. 1 is a diagram illustrating an overall configuration of a wireless communication system according to a first embodiment of the present disclosure.

Hereinafter, embodiments of the present disclosure will be described with reference to the drawings. As shown in FIG. 1, a wireless communication system 1 according to a first embodiment includes roadside devices 2 and a vehicle-mounted device 3. The vehicle-mounted device 3 corresponds to a wireless communication device.

Next, a schematic configuration of the wireless communication system 1 will be described. Although FIG. 1 shows two roadside devices 2A and 2B, three or more roadside devices 2 may be used. When the multiple roadside devices 2A and 2B are not necessary to be distinguished, those roadside devices 2A and 2B are referred to as roadside devices 2. In addition, although only one vehicle-mounted device 3 is shown in FIG. 1, multiple vehicle-mounted devices 3 may also be used. Each roadside device 2 and the vehicle-mounted device 3 communicate with each other according to the WAVE standard.

Since the roadside devices 2 and the vehicle-mounted device 3 conform to the WAVE standard, the wireless communication system 1 sets one control channel and the multiple service channels as the communication channels. The control channel and the multiple service channels are set to predetermined different frequency channels from each other. Both of those control channels and service channels belong to the 5.8 GHz frequency band or the 5.9 GHz frequency band.

The roadside device 2 corresponds to a service providing station, and notifies the WSA (WAVE Service Advertisement) using a control channel. The WSA corresponds to service start information and contains various information to be acquired by the vehicle-mounted device 3 in order to start the service. For example, the WSA includes channel information designating any service channel. Further, the roadside device 2 transmits the service execution information using the service channel designated by the WSA. The roadside device 2 may be fixed to the road side or may be a moving type device. The service execution information is information required for the roadside device 2 and the vehicle-mounted device 3 to communicate with each other in order to execute the service, and includes information transmitted by the roadside device 2 and information transmitted by the vehicle-mounted device 3. However, for example, for some services such as the distribution service of road traffic information, the service execution information includes only the information transmitted by the roadside device 2.

The vehicle-mounted device 3 is mounted on the vehicle 4 and receives the WSA and the service execution information. Further, a vehicle-to-vehicle communication can be performed with another vehicle-mounted device 3. The vehicle 4 includes various vehicles traveling on a road such as passenger cars, buses, and trucks. Also, in FIG. 1, a four-wheeled vehicle is illustrated as the vehicle 4, but the vehicle 4 may be a two-wheeled vehicle. The two-wheeled vehicle includes a bicycle.

Next, a configuration of the roadside device 2 will be described. The roadside device 2 performs a road-to-vehicle communication with the vehicle-mounted device 3 existing in the wireless communication area defined by the roadside device 2, transmits various information to the vehicle-mounted device 3, and obtains various information from the vehicle-mounted device 3 to execute a predetermined service.

The roadside device 2 is located at a position suitable for the service provided by the roadside device 2. For example, the roadside device 2 is provided at an intersection, an intermediate point of a road connecting the intersection and another intersection, and an entrance to a specific facility (for example, a parking lot, a shop, and a toll road) and the like. The wireless communication area of the roadside device 2 can be set according to the service provided by the roadside device 2. In other words, the output of the radio waves transmitted by the roadside device 2 can be set according to the service provided by the roadside device 2. When the set wireless communication area is wide, the set wireless communication area may overlap with the wireless communication area of another roadside device 2.

FIG. 1 also shows a wireless communication area 6A of the roadside device 2A and a wireless communication area 6B of the roadside device 2B. As shown in FIG. 1, those two wireless communication areas 6A and 6B partially overlap with each other.

Figure 2:
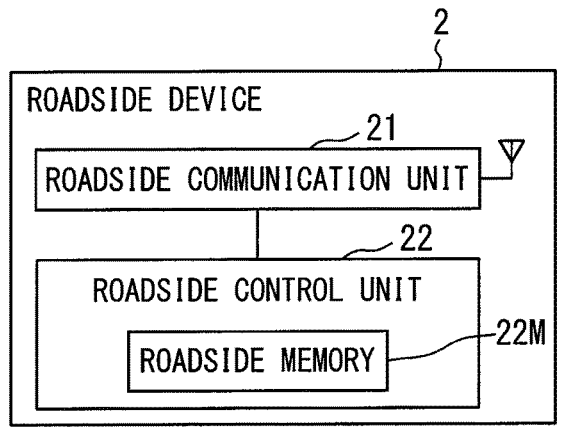
FIG. 2 is a block diagram showing a configuration of a roadside device in FIG. 1.

As illustrated in FIG. 2, the roadside device 2 includes a roadside communication unit 21 and a roadside control unit 22. The roadside communication unit 21 and the roadside control unit 22 are connected to each other so as to be mutually communicable.

The roadside communication unit 21 performs a road-to-vehicle communication with the vehicle-mounted device 3 existing within the wireless communication area provided by the roadside device 2 via a short range communication. The short range communication is a communication method in which a direct communication is performed through no relay device. The wireless communication area defined by the roadside device 2 is often several hundred meters in radius, but varies depending on the service provided by the roadside device 2, and may be about 10 meters in radius or about 1 km in radius. The roadside communication unit 21 demodulates a signal received from the vehicle-mounted device 3 and outputs the demodulated signal to the roadside control unit 22, modulates data input from the roadside control unit 22, and further converts the modulated data into a radio wave, and transmits the radio wave.

The roadside communication unit 21 has two operation modes, that is, a mode of communicating using a control channel and a mode of communicating using a service channel. In other words, both of the communication using the control channel and the communication using the service channel are performed through the roadside communication unit 21. Both of the communication using the control channel and the communication using the service channel are carried out with the vehicle-mounted device 3.

The roadside control unit 22 is provided by a general computer, and includes a well-known CPU, a nonvolatile memory such as a ROM and a flash memory, a volatile memory such as a RAM, an I/O, a bus line connecting those components to each other.

A roadside memory 22M included in the roadside control unit 22 is a nonvolatile storage medium, and is provided by, for example, a flash memory. A program module and data for executing various processing, a terminal ID assigned to the roadside device 2, and the like are stored in the roadside memory 22M. In addition, information for generating the WSA and information for generating service execution information are also stored in the roadside memory 22M.

Figure 3:
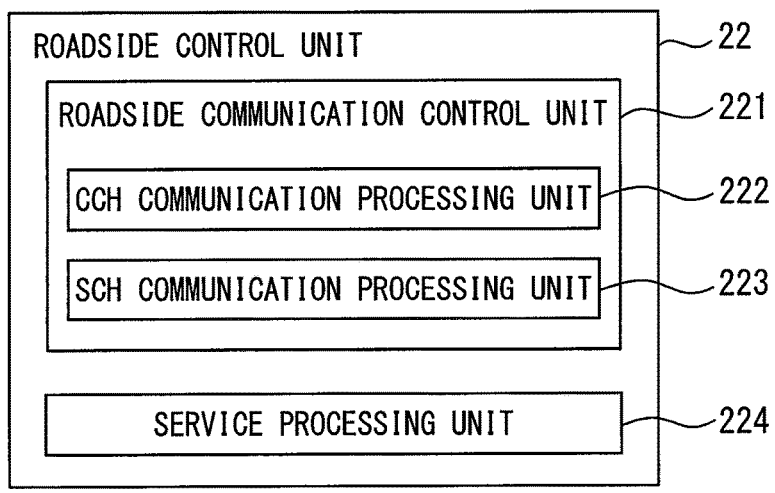
FIG. 3 is a block diagram showing a function of a roadside control unit in FIG. 2.

As shown in FIG. 3, the roadside control unit 22 includes a roadside communication control unit 221 and a service processing unit 224 as functional blocks, and the functional blocks are achieved by executing the program module described above. A part or all of functions to be executed by the roadside control unit 22 may be configured by one or multiple ICs in a hardware configuration.

The roadside communication control unit 221 controls the operation of the roadside communication unit 21 and switches the communication between a communication using a control channel and communication using a service channel. The roadside communication control unit 221 generates information to be transmitted from the roadside communication unit 21 according to the operation mode of the roadside communication unit 21 and controls the roadside communication unit 21 to transmit the generated information. In addition, the roadside communication unit 21 acquires the reception data and provides the acquired data to the service processing unit 224.

The roadside communication control unit 221 includes a CCH communication processing unit 222 and an SCH communication processing unit 223 as functional blocks. The CCH in the name of each part means a control channel (Control Channel), and the SCH means a service channel (Service Channel).

The CCH communication processing unit 222 performs a control of the communication using the control channel. The CCH communication processing unit 222 generates the WSA, sets a transmission channel of the roadside communication unit 21 as the control channel, and controls the generated WSA to be transmitted to the roadside communication unit 21 by a broadcast method. In addition, the CCH communication processing unit 222 acquires the data received by the roadside communication unit 21 in the communication using the control channel, and provides the reception data to the service processing unit 224.

The SCH communication processing unit 223 performs a control of the communication using a predetermined service channel. The SCH communication processing unit 223 generates service execution information, sets the transmission channel of the roadside communication unit 21 as a service channel determined according to the type of service, and controls the generated service execution information to be transmitted to the roadside communication unit 21. The transmission method may be one of broadcast, unicast, and multicast, and the communication method to be used depends on the type of service. In addition, the SCH communication processing unit 223 acquires the data received by the roadside communication unit 21 in the communication using the service channel, and provides the acquired data to the service processing unit 224.

The service processing unit 224 provides a predetermined service to the vehicle-mounted device 3 based on the data provided from the roadside communication control unit 221. The provided service is, for example, an automatic toll collection service when traveling on a toll road, an automatic parking fee collection service at a time of parking, a traffic information distribution service, a position information notification service, an advertisement distribution service, and the like.

Figure 4:
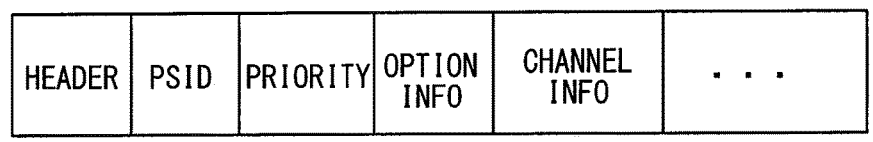
FIG. 4 is a diagram exemplifying a configuration of a WSA generated by a CCH communication processing unit in FIG. 3.

FIG. 4 exemplifies a configuration of the WSA generated by a CCH communication processing unit 222. As shown in FIG. 4, the WSA includes a header, a PSID, a priority, option information, and channel information. The header is information for recognizing that the reception data is WSA in the vehicle-mounted device 3 which is the receiving side device. For example, the header includes information indicating the version of the WAVE standard, information for distinguishing the WSA from other information such as service execution information, and the like.

The PSID is information for determining the type of service provided by the service provider through the roadside device 2. The priority corresponds to service priority information, and is information for determining the priority of the service specified by the PSID among the various services provided by the various roadside devices 2. The option information is information to be added when promptly instructing the vehicle-mounted device 3 to set the reception channel to be the service channel, or when instructing the vehicle-mounted device 3 to extend a duration of the service channel. The option information in the former case is expressed as "immediately" and the option information in the latter case is expressed as "extend". "Immediately" is an instant start instruction. If none of those cases is selected, option information is not added. In addition, when the "extend" is added as the option information, the service channel time length which is a period during which the reception channel is set as the service channel is also included in the WSA. The service channel time length is longer than a time length of the service channel time frame defined under a reference time division.

The channel information is a channel number of the service channel used for the roadside device 2 to provide the service among the multiple service channels. The service channel may be determined according to the service to be provided, and the multiple services may be associated with the same service channel.

Figure 5:
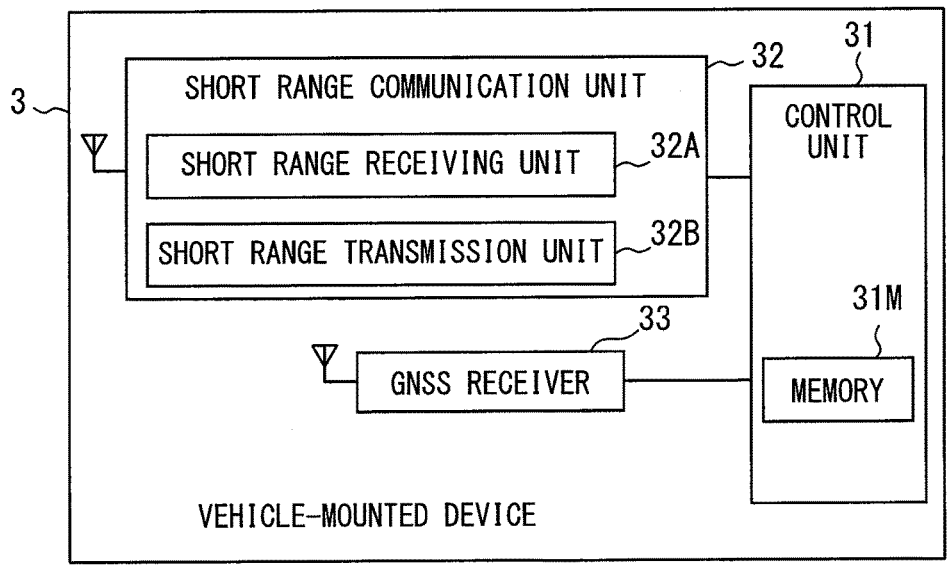
FIG. 5 is a block diagram showing a configuration of a vehicle-mounted device in FIG. 1.

Next, a configuration of the vehicle-mounted device 3 will be described. As shown in FIG. 5, the vehicle-mounted device 3 includes a control unit 31, a short range communication unit 32, and a GNSS receiver 33. The control unit 31 is connected to the short range communication unit 32 and the GNSS receiver 33 so as to communicate with each other.

The short range communication unit 32 performs a short range communication with the roadside communication unit 21 of the roadside device 2 and a short range communication unit 32 of another vehicle-mounted device 3. A communication distance of the short range communication unit 32 is, for example, about several hundred meters. Further, in the short range communication according to the present embodiment, the control channel or the service channel described above is used. The short range communication unit 32 includes a short range receiving unit 32A that demodulates the signal received by the antenna and outputs the demodulated signal to the control unit 31. The short range communication section 32 also includes a short range transmission unit 32B that modulates the data input from the control unit 31, further converts the modulated data into radio waves and transmits the converted radio waves to circumference.

The short range receiving unit 32A selects and sets one channel from among the control channel and the multiple service channels as a reception channel which is a frequency channel for receiving the radio waves. The short range receiving unit 32A receives the radio waves transmitted from the roadside device 2 using the set reception channel. The short range receiving unit 32A demodulates the received radio waves, extracts a signal, and outputs the signal to the roadside control unit 22.

The short range transmission unit 32B selects one channel from the control channel and the multiple service channels, and sets a transmission channel which is a frequency channel for transmitting the radio waves as the selected channel. The short range transmission unit 32B modulates the data input from the roadside control unit 22, further converts the converted data into the radio waves having a frequency of the transmission channel, and transmits the converted radio waves.

The GNSS receiver 33 corresponds to an example of a position detection unit and calculates a current position of the GNSS receiver 33 upon receiving of the radio waves from the satellites used in a GNSS (Global Navigation Satellite System). The current position calculated by the GNSS receiver 33 is represented by, for example, a latitude and a longitude. Information indicating the current position calculated by the GNSS receiver 33 is sequentially provided (for example, every 100 milliseconds) to the control unit 31.

The control unit 31 is provided by a general computer, and includes a well-known CPU, a nonvolatile memory such as a ROM and a flash memory, a volatile memory such as a RAM, an I/O, a bus line (none shown) connecting those components to each other.

A memory 31M included in the control unit 31 is a nonvolatile storage medium, and is provided by, for example, a flash memory, a ROM, or the like. A program module and data for executing various processing, a terminal ID assigned to the vehicle-mounted device 3 are stored in the memory 31M. The WSA received by the short range communication unit 32 is temporarily stored in the memory 31M.

Figure 6:
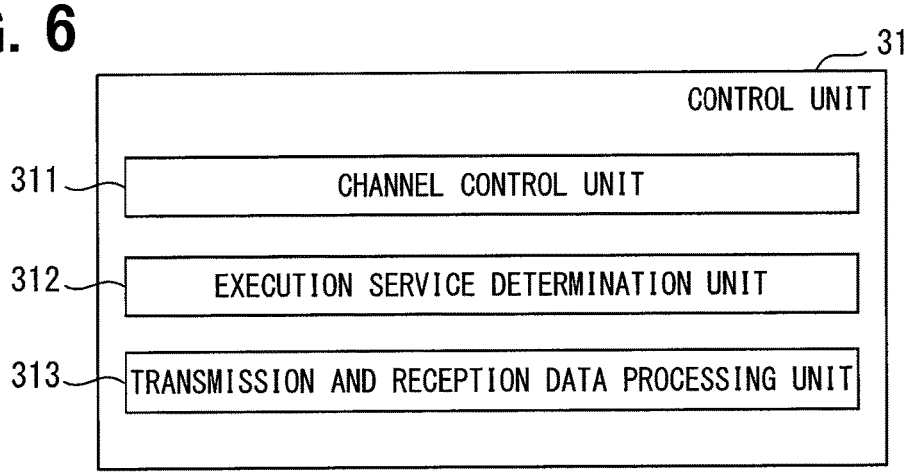
FIG. 6 is a block diagram showing a function of a control unit in FIG. 5.

As shown in FIG. 6, the control unit 31 includes a channel control unit 311, an execution service determination unit 312, and a transmission and reception data processing unit 313 as functional blocks, and the functional blocks are achieved by execution of the program module described above. A part or all of functions to be executed by the control unit 31 may be configured by one or multiple ICs in a hardware configuration.

The channel control unit 311 sets the communication channel of the short range communication unit 32 to one of the control channel and the service channels. Therefore, when the channel control unit 311 does not set the communication channel of the short range communication unit 32 as the service channel, the channel control unit 311 sets the communication channel as the control channel. Communication is performed using the set channel. The processing executed by the channel control unit 311 will be described in detail later with reference to a flowchart shown in FIG. 8.

When the short range receiving unit 32A receives the WSA while the channel control unit 311 sets the communication channel as the control channel, the execution service determination unit 312 determines a service (hereinafter referred to as execution service) to be executed based on the received WSA. Processing for determining the execution service is called an execution service determination process. Details of the execution service determination process will be described with reference to FIG. 9.

The transmission and reception data processing unit 313 acquires the data demodulated by the short range receiving unit 32A and executes various processes according to the acquired data. For example, the transmission and reception data processing unit 313 determines whether the data acquired from the short range receiving unit 32A is data conforming to the WAVE protocol, or not. Also, the transmission and reception data processing unit 313 determines the data requested by the roadside device 2 based on the data acquired from the short range receiving unit 32A, and generates the data requested by the roadside device 2 as transmission data.

Figure 7:
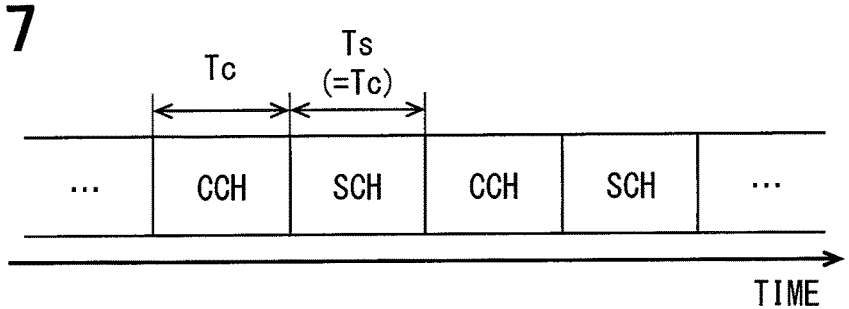
FIG. 7 is a diagram exemplifying a temporal change in a communication channel of a short range communication unit.

FIG. 7 shows an example of a temporal change in the communication channel of the short range communication unit 32. The communication channel of the short range communication unit 32 includes the reception channel of the short range receiving unit 32A and the transmission channel of the short range transmission unit 32B.

In the example of FIG. 7, the control channel and the service channel are set alternately at regular time intervals (for example, 50 milliseconds). A time frame (hereinafter referred to as control channel time frame) serving as the control channel and a time frame (hereinafter referred to as service channel time frame) serving as the service channel are defined by setting a time determined under reference time system such as an UTC as a start time or an end time.

A time division in which the control channel time frame and the service channel time frame are alternately switched at regular time intervals, and setting of the start and end time of the control channel time frame under the reference time system, and a setting of the start and end time of the service channel time frame under the reference time system is referred to as a reference time division in the present embodiment. The time in the reference time system is determined according to time data included in the radio waves received by the GNSS receiver 33.

In the reference time division, the time determined by the reference time system is set as a channel switching time. Therefore, the roadside communication unit 21 of the roadside device 2 and the short range communication unit 32 of the vehicle-mounted device 3 can switch the communication channel to another in synchronization with each other.

The reason why the channel control unit 311 changes the communication channel of the short range communication unit 32 according to the reference time division is that there is a case in which the short range receiving unit 32A receives the WSA and option information is not included in the received WSA.

In other words, if the option information is not included in the WSA that has received in the control channel to which the reception channel is set, even if the WSA is received, the reception channel is maintained as the control channel until a start time of the service channel time frame in the reference time division is arrived. In the reference time division, the reception channel is set as the service channel according to the service channel time frame.

Also when "extend" is included as the option information in the WSA that has received in the control channel to which the reception channel is set, a time at which the reception channel is switched to the service channel is the same as that when the option information is not included in the WSA. However, if "extend" is included as the option information in the WSA, a time length for which the reception channel is maintained as the service channel is longer than a time length in the case where the option information is not included in the WSA.

On the other hand, if "immediately" is included as the option information in the WSA that has received in the control channel to which the reception channel is set, the reception channel is set to be the service channel specified by the channel information of the WSA promptly upon receiving of the WSA.

The channel control unit 311 maintains the reception channel of the short range receiving unit 32A as the control channel while the WSA has not yet been received after the vehicle-mounted device 3 has been powered on. The channel control unit 311 also maintains the reception channel of the short range receiving unit 32A as the control channel until the next reception of the WSA after a communication relating to a certain service has been completed.

A service that switches the reception channel to the service channel at the start time of the service time frame under the reference time division is referred to as a standard start service. Therefore, a service that does not have option information added to the WSA, and a service that has WSA added with "extend" as the option information are standard start services. On the other hand, a service with "immediately" added as optional information to the WSA is not a standard start service.

Next, a process performed by the channel control unit 311 will be described. The channel control unit 311 periodically executes processing shown in FIG. 8. However, in FIG. 8, Step S9 is a process to be executed by the transmission and reception data processing unit 313. The other steps are executed by the channel control unit 311.

In Step S1, it is determined whether there is a channel open request, or not. The channel open request is input to the channel control unit 311 when the execution service determination unit 312 executes Step S28 in FIG. 9.

If the determination in Step S1 is NO, the process proceeds to Step S2. In Step S2, it is determined whether a service is under execution, or not. In order to execute some service, after the vehicle-mounted device 3 starts a communication with the roadside device 2, the determination of Step S2 is kept YES until the communication is completed and the connection state is disconnected. If it is determined that there is a service is under execution, the process proceeds to Step S3, and if it is determined that there is no service is under execution, the process proceeds to Step S5.

In Step S3, it is determined whether the channel switching time has come, or not. Specifically, the channel switching time means the channel switching time in the reference time division when the service not added with the option information is being executed. When a service with "extend" added as option information is executed, the channel switching time is a time that a service channel time length designated by the WSA has elapsed from a time when the reception channel is set as the service channel. If the determination in Step S3 is YES, the process proceeds to Step S4, and if the determination is NO, the process proceeds to Step S5.

In Step S4, a channel switching process is executed. Specifically, when the determination in Step S1 is YES and Step S4 is executed, the service channel instructed by the channel open request is set as the reception channel. If the determination in Step S3 is YES, Step S4 is to be executed and the reception channel is currently set as the service channel, the reception channel is switched to the control channel. If the determination in Step S3 is YES and Step S4 is executed and the reception channel is currently set as the control channel, the service channel set as the reception channel immediately before that time is again set as the reception channel.

In Step S5, it is determined whether there is transmission data, or not. The transmission data is generated by the transmission and reception data processing unit 313 as described above. When the transmission and reception data processing unit 313 supplies the transmission data to the channel control unit 311 that has generated the transmission data, the determination in Step S5 becomes YES. If the determination in Step 5 is YES, the process proceeds to Step S6. In Step S6, the transmission data is transmitted to the outside from the short range transmission unit 32B as the radio waves. If Step S6 is executed, or if the determination in Step S5 is NO, the process proceeds to Step S7.

Figure 8:
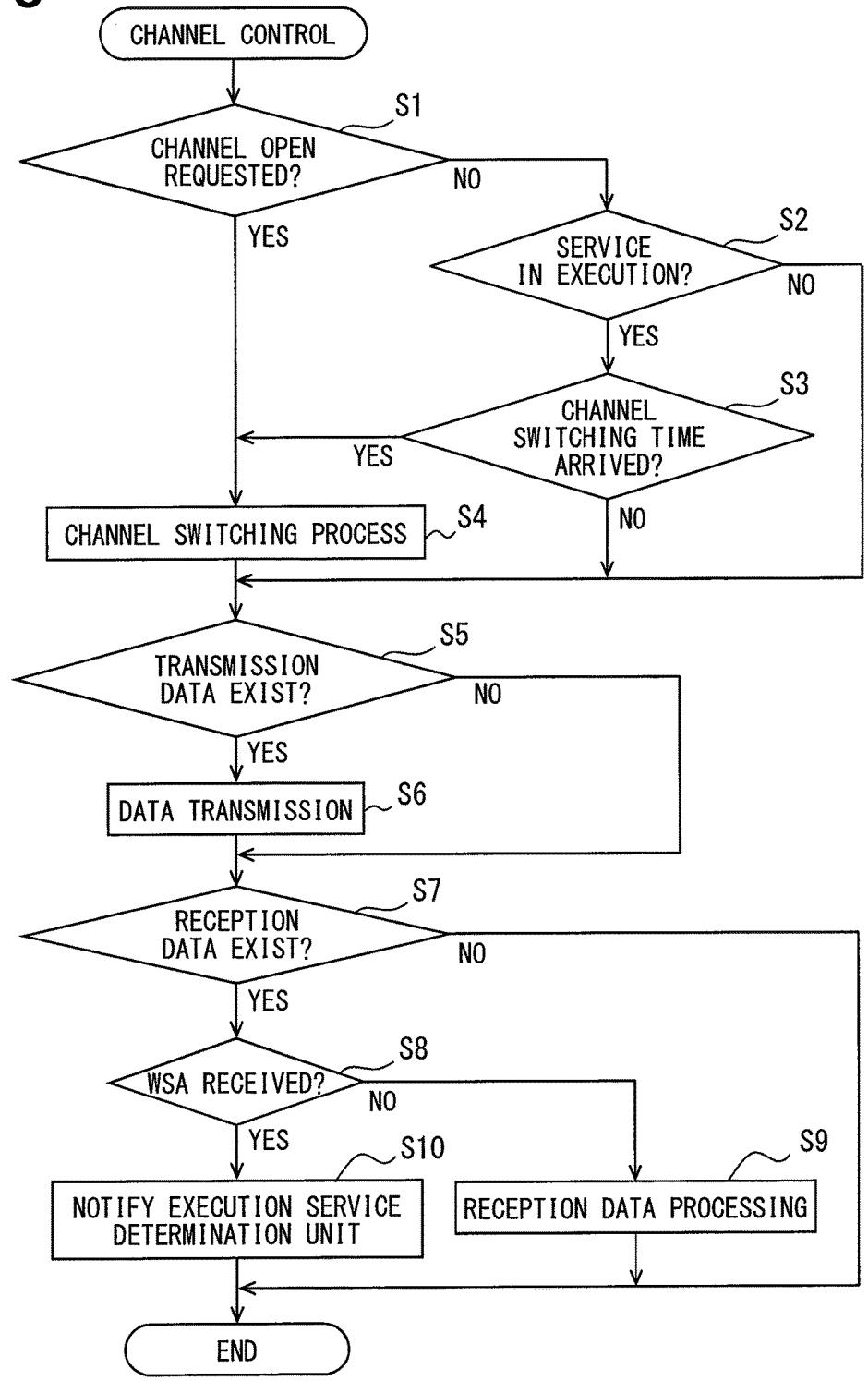
FIG. 8 is a flowchart showing a process to be executed by a channel control unit in FIG. 6.

In Step S7, it is determined whether there is reception data, or not. If the determination is NO, the processing of FIG. 8 is terminated. In this case, after a certain period of time has elapsed, Step S1 is executed again. If the determination in Step S7 is YES, the process proceeds to Step S8.

In Step S8, it is determined whether the reception data is the WSA, or not. Whether the reception data is a WSA or not is judged from information stored in the header of the reception data, for example. If the reception channel is the service channel, since no WSA is received. Therefore, the determination in Step S8 is NO if the reception channel is the service channel. If the determination in Step S8 is NO, the process proceeds to Step S9.

In Step S9, reception data processing determined according to the type of reception data is executed. The reception data processing includes, for example, a process of determining whether the reception data is data conforming to the WAVE protocol, or not, a process of generating and transmitting data required by the reception data as the transmission data, and the like.

If the determination in Step S8 is YES, the process proceeds to Step S10. When the process proceeds to Step S10, the reception data is WSA. In Step S10, the short range receiving unit 32A notifies the execution service determination unit 312 that the WSA has been received.

Next, a process performed by the execution service determination unit 312 will be described. The execution service determination unit 312 periodically executes the processing shown in FIG. 9 when the reception channel of the short range receiving unit 32A is set as the control channel. In Step S21, it is determined whether the short range receiving unit 32A has received the WSA, or not. When the channel control unit 311 executes Step S10 in FIG. 8, the execution service determination unit 312 is notified that the short range receiving unit 32A has received the WSA. When the notification is received, the determination in Step S21 becomes YES. If there is no notification, the determination in Step S21 is NO. If the determination in Step S21 is NO, the process proceeds to Step S22.

Figure 9:
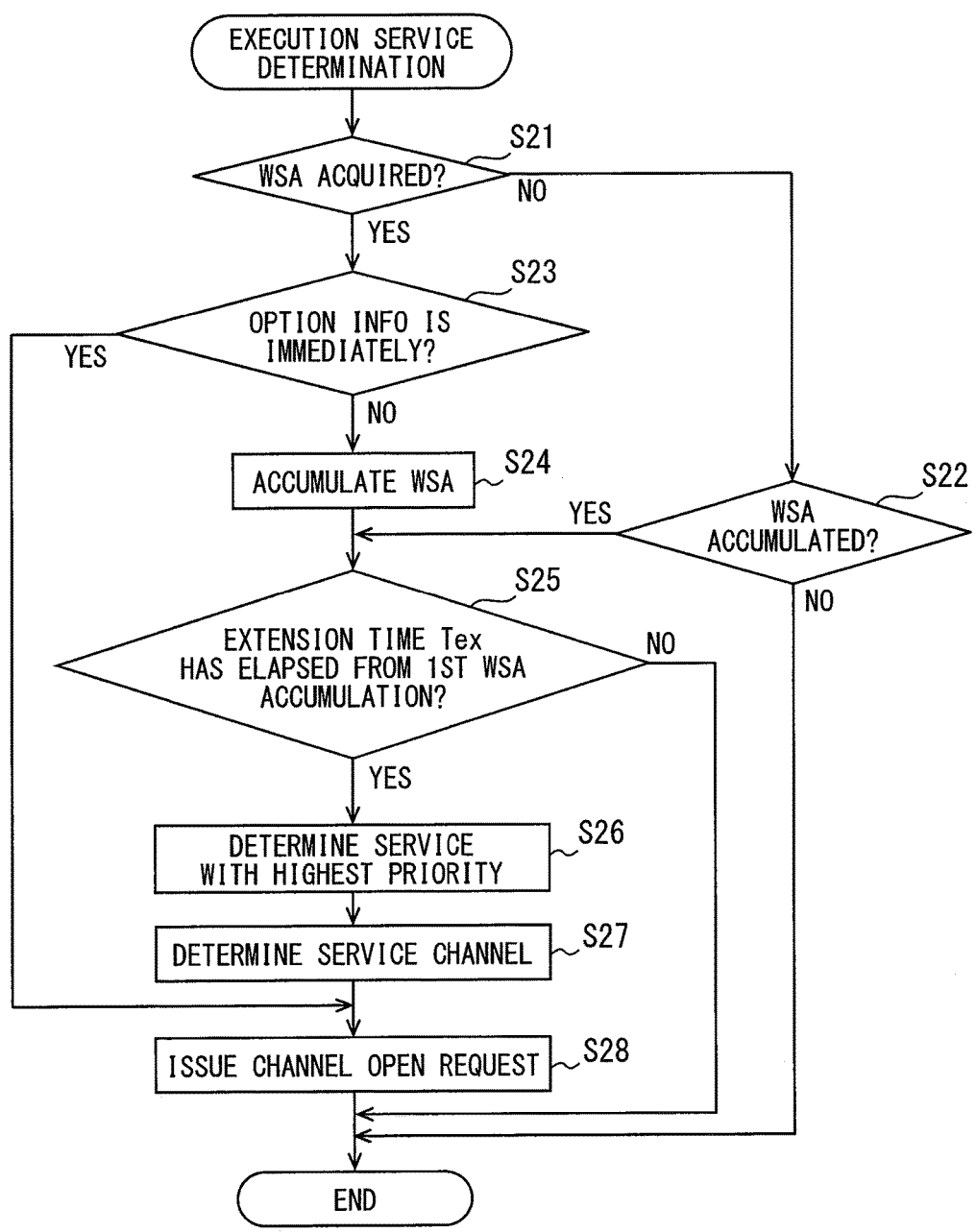
FIG. 9 is a flowchart showing a process to be executed by an execution service determination unit in FIG. 6.

In Step S22, it is determined whether accumulated WSAs exist in the memory 31M, or not. If the determination is NO, the processing of FIG. 9 is terminated. On the other hand, if the determination in Step S22 is YES, the process proceeds to Step S25 to be described later.

If the determination in Step 21 is YES, the process proceeds to Step S23. In Step S23, it is determined whether the option information of the WSA received by the short range receiving unit 32A is "immediately", or not. If the determination is YES, the process proceeds to Step S28, and if the determination is NO, the process proceeds to Step S24.

In Step S24, the WSA currently received in the short range receiving unit 32A is stored in the memory 31M together with the reception time. If Step S24 has been executed, or if the determination in Step S22 is YES, the process proceeds to Step S25. Proceeding of the process to Step S25 indicates that the WSA is stored in the memory 31M.

In Step S25, it is determined whether an extension time Tex has elapsed since the first-received WSA is accumulated in the memory 31M in a state in which the service is not under execution, that is, in a state in which the reception channel is set to the control channel. If the determination is NO, the process of FIG. 9 is terminated without issuing a channel open request in Step S28.

The extension time Tex is set to be longer than a time length obtained by combining one control channel time frame with one service channel time frame defined under the reference time division. Therefore, with the determination step of Step S25, after accumulating the WSA for the first time, the reception channel is maintained at the control channel without changing the reception channel to the service channel for at least one service channel time frame. More specifically, the extension time Tex according to the present embodiment is set to a time length obtained by combining two control channel time frames with two service channel time frames defined under the reference time division. Therefore, in two service channel time frames after first accumulating the WSA, the reception channel is maintained at the control channel. In the present embodiment, two service channel time frames after accumulating the first-received WSA correspond to an extension time frame.

Figures 10, 11:
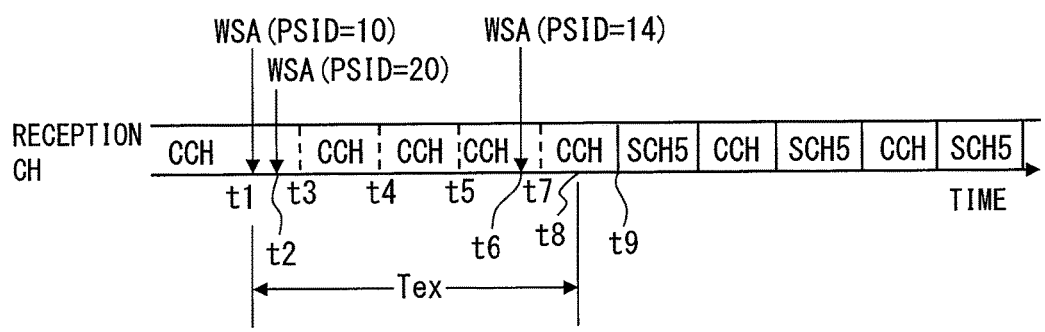
FIG. 10 is a diagram showing as a list a multiple WSAs stored in a memory of FIG. 5.
FIG. 11 is a diagram showing a temporal change in a reception channel of a short range receiving unit.

If the extension time Tex has elapsed after the accumulation of the first-received WSA and the determination in Step S25 is YES, the process proceeds to Step S26. While the reception channel is maintained as the control channel, if the WSA for which the option information is not "immediately" has been acquired, the WSA is stored in the memory 31M. Therefore, when Step S26 is executed, there is a case where the multiple WSAs are stored in the memory 31M. FIG. 10 shows a list of the multiple WSAs stored in the memory 31M.

In Step S26, among the WSAs stored in the memory 31M, a service having the highest priority of the service indicated by the WSA is determined. When only one WSA is stored in the memory 31M, the service indicated by the WSA is determined as the service with the highest priority. The service determined as the service with the highest priority is determined as the execution service. For example, when three WSAs illustrated in FIG. 10 have been stored in the memory 31M at the time of executing Step S26, a service with PSID=14 is determined as an execution service. In the first embodiment, the process in Step S26 is an execution service determination process. Information for determining a service provider that provides the service is stored in a predetermined storage unit such as the memory 31M, and the service provider is determined based on the PSID.

In subsequent Step S27, the service channel corresponding to the execution service is determined with reference to the channel information of the WSA representing the service determined as the execution service. Further, in Step S27, the WSA representing the execution service is deleted from the memory 31M.

In Step S28, a channel open request is issued. The channel open request is a signal for designating a service channel and requesting the channel control unit 311 to set the service channel as the communication channel. Step S28 is executed when the service channel is determined in Step S27 or when the determination in Step S23 is YES. When Step S28 is executed after Step S27, a channel open request designating the service channel determined in Step S27 is issued. When Step S28 is executed in response to a determination of YES in Step S23, a channel open request designating a service channel determined according to the currently received WSA is issued.

In the first embodiment, even after the short range receiving unit 32A has received the WSA, if the option information of the WSA is not "immediately" (NO in S23), the execution service determination unit 312 does not issue the channel open request until the extension time Tex has elapsed (S25 to S28). Further, the extension time Tex is set to be longer than a time length obtained by combining one control channel time frame with one service channel time frame defined under the reference time division.

Therefore, even after the short range receiving unit 32A has received the WSA, the channel control unit 311 maintains the reception channel as the control channel during at least one service channel time frame. As a result, when the WSA is transmitted from the roadside device 2 while the reception channel is set as the control channel even in the service channel time frame, the short range receiving unit 32A can receive the WSA.

The execution service determination unit 312 determines, as an execution service, a service with the highest priority among the services represented by respective WSAs received while the short range receiving unit 32A uses the reception channel as the control channel (S26), and issues a channel open request for executing the determined execution service to the channel control unit 311 (S28). As a result, the channel control unit 311 sets the reception channel to the service channel corresponding to the execution service (S4). Therefore, execution failure of the communication for executing the service with the high priority can be prevented.

FIG. 11 shows a time chart when the WSAs illustrated in FIG. 10 are received on a time axis. The WSA with PSID=10 is received at a time t1. A time t3 is a start time of the first service channel time frame after the time t1. At a time t2 which is a time before the time t3, the WSA with the PSID=20 is received. Conventionally, a service channel determined by the WSA with the higher priority among the two WSAs received at the times t1 and t2, which are times prior to a time t3, is opened from the time t3. In the present embodiment, the reception channel is also maintained at the control channel from the time t3 to a time t4 which is defined as a service channel time frame. It is needless to say that the reception channel is maintained as the control channel from the time t4 to the time t5 which is defined as a subsequent control channel time frame.

Furthermore, although a time from the time t5 to a time t7 is a service channel time frame, since the extension time Tex has not elapsed at the time t5, the control channel is maintained also from the time t5 to the time t7. At the time t6 between the time t5 and the time t7, the WSA with PSID=14 is received. As a result, a list of the WSAs illustrated in FIG. 10 is created. A time t8 is a time at which the extension time Tex has elapsed after the first-received WSA is accumulated. Therefore, in Step S25 executed after the time t8, the determination result is YES. In Step S26 to be executed thereafter, PSID=14 whose priority level is 1 is determined as the execution service. In Step S27, the service channel SCHS is determined as a service channel to be opened. In Step S28, since a channel open request that has designated the service channel SCHS is issued, the reception channel is set as the service channel SCHS from a time t9 which is the start time of the service channel time frame. As described above, according to the present embodiment, the execution failure of the communication for executing the service with the high priority can be prevented.

Thereafter, until the communication using the service channel SCHS is completed, the reception channel is set to the service channel SCHS in the service channel time frame, and the reception channel is set as the control channel in each control channel time frame.

Second Embodiment

Next, a second embodiment will be described. In the second embodiment and the subsequent embodiments, elements having symbols of the same numbers as those of the symbols used up to now are identical with the elements having the same symbols in the previous embodiment except as otherwise stated. When only a part of a configuration is described, the embodiment described previously can be applied to the other parts of the configuration.

Figures 12, 13:
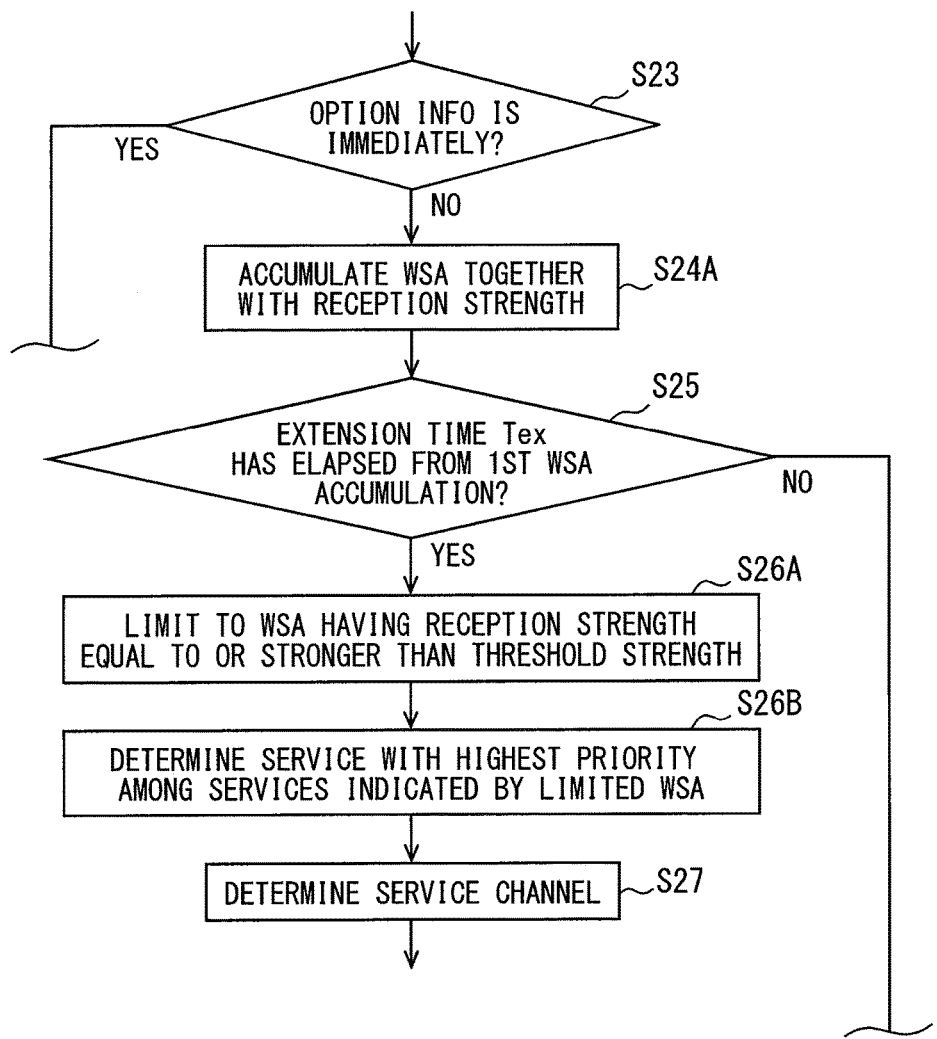
FIG. 12 is a flowchart showing a process to be executed by an execution service determination unit in place of that in FIG. 9 according to a second embodiment of the present disclosure.
FIG. 13 is a diagram illustrating a WSA generated by a CCH communication processing unit of a roadside control unit according to a third embodiment of the present disclosure.

In the second embodiment, the execution service determination unit 312 of the control unit 31 in the vehicle-mounted device 3 executes the processing shown in FIG. 12 instead of FIG. 9. In the process shown in FIG. 12, Step S24A is executed instead of Step S24 in FIG. 9, and Steps S26A and S26B are executed instead of Step S26 in FIG. 9. The other processing is the same as in FIG. 9. In the second embodiment, Steps S26A and S26B correspond to an execution service determination process.

In Step S24A, a reception strength of the WSA received by the short range receiving unit 32A is determined. The WSA is accumulated in the memory 31M together with the reception strength and the reception time. This Step S24A corresponds to an example of the reception strength determination unit.

In Step S26A, the WSA whose reception strength is equal to or higher than a threshold strength is selected from the WSAs stored in the memory 31M. The threshold strength is set in advance to a strength at which a communication can be performed with a communication quality higher than a certain level.

In Step S26B, among the WSAs selected in Step S26A, the service with the highest priority of the service indicated by the WSA is determined. The service determined as the service with the highest priority is determined as the execution service.

In the second embodiment, with the execution of Step S26A, a target to be determined as the service with the highest priority is limited to a service represented by the WSA whose reception strength is equal to or higher than a threshold strength among the WSAs stored in the memory 31M. As a result, a start of the service whose priority is high but signal strength is not strong enough to perform the transmission and reception for executing the service can be prevented.

Third Embodiment

In a third embodiment, a CCH communication processing unit 222 of a roadside control unit 22 generates a WSA shown in FIG. 13. The WSA shown in FIG. 13 is a data configuration in which roadside device position information is added to the WSA of the first embodiment shown in FIG. 4. The roadside device position information is information indicating a position of a roadside device 2 that has transmitted the WSA.

Figure 14:
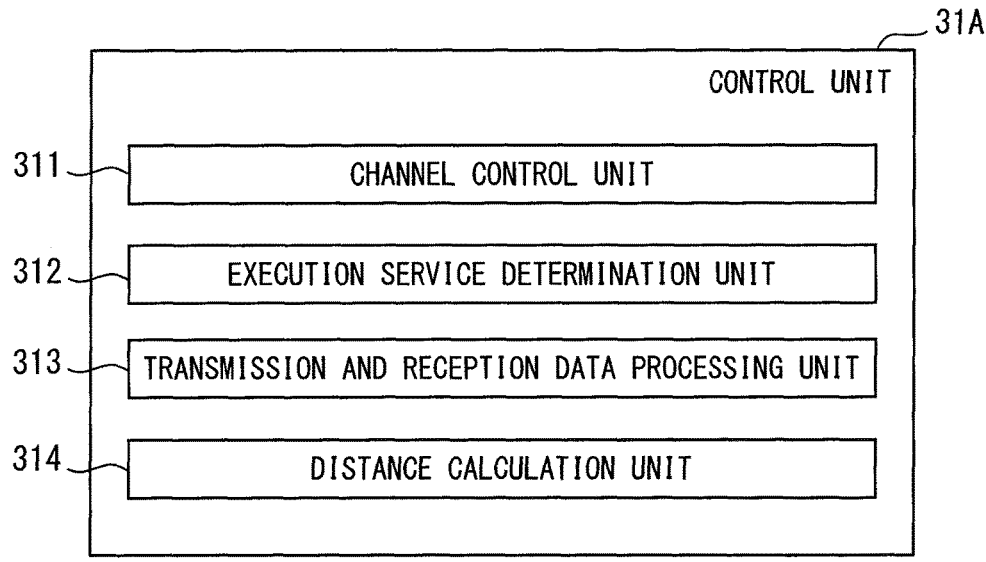
FIG. 14 is a block diagram showing a function of a control unit according to the third embodiment.

FIG. 14 shows the functions of a control unit 31A in a vehicle-mounted device 3 according to the third embodiment. The control unit 31A includes a distance calculation unit 314 in addition to a channel control unit 311, an execution service determination unit 312, and a transmission and reception data processing unit 313 included in the control unit 31 according to the first embodiment.

The distance calculation unit 314 calculates a distance between the roadside device 2 that has transmitted the WSA and the vehicle-mounted device 3 based on the current position calculated by the GNSS and the position of the roadside device 2 represented by the roadside device position information included in the WSA. The distance is calculated for each roadside device 2 when multiple WSAs have been received from multiple roadside devices 2.

Figure 15:
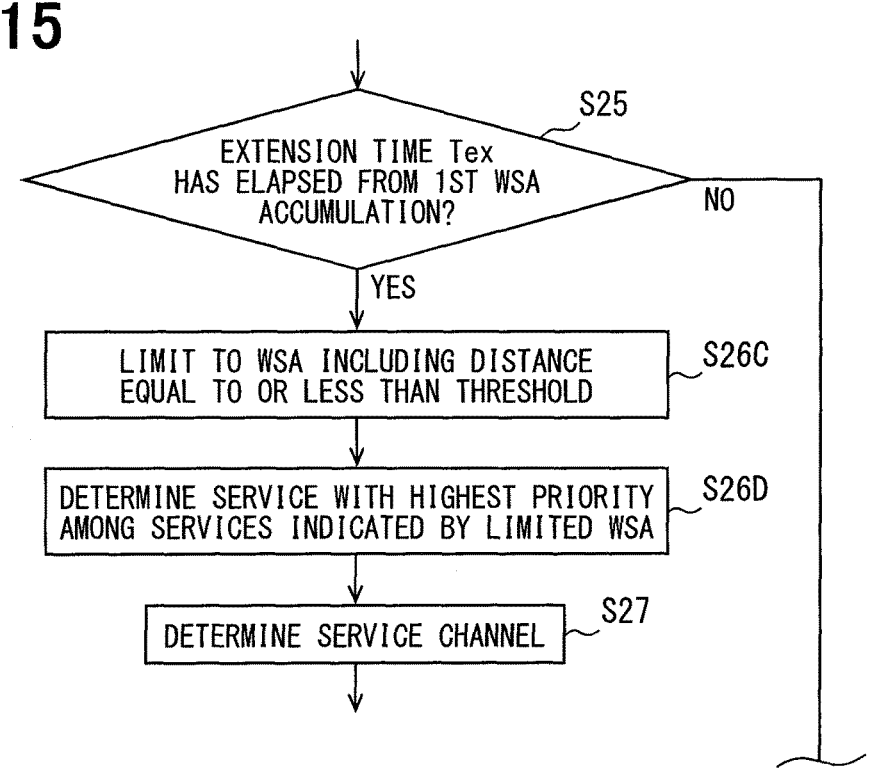
FIG. 15 is a flowchart showing a process to be executed by an execution service determination unit of the control unit according to the third embodiment.

In the third embodiment, the execution service determination unit 312 of the control unit 31A in the vehicle-mounted device 3 executes the processing shown in FIG. 15 instead of FIG. 9. In the processing shown in FIG. 15, Steps S26C and S26D are executed in place of Step S26 in FIG. 9. The other processing is the same as in FIG. 9. In the third embodiment, Steps S26C and S26D correspond to an execution service determination process.

In Step S26C, among the WSAs stored in the memory 31M, the WSA whose distance calculated by the distance calculation unit 314 is equal to or less than a threshold distance is selected. The threshold distance is set in advance, and is set, for example, to a distance obtained by multiplying the communicable distance of the short range transmission unit 32B by a coefficient smaller than 1. Since the communication using the service channel is usually unicast or multicast, it is necessary for the roadside device 2 to reliably receive a signal wirelessly transmitted by the short range transmission unit 32B.

In Step S26D, among the WSAs selected in Step S26C, the service with the highest priority of the service indicated by the WSA is determined. The service determined as the service with the highest priority is determined as the execution service.

In the third embodiment, with the execution of Step S26C, a target to be determined as the service with the highest priority is limited to a service represented by the WSA whose distance is equal to or less than a threshold distance among the WSAs stored in the memory 31M. As a result, when a service has high priority but a large communication distance cannot ensure sufficient signal strength to perform data transmission and reception for executing the service, start of this kind of service can be prevented.

Fourth Embodiment

Figure 16:
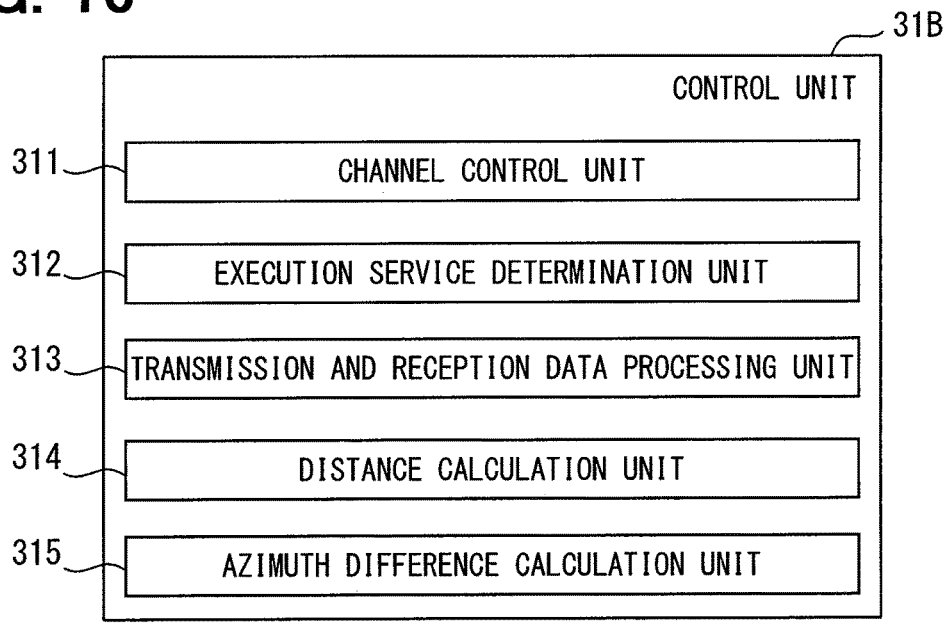
FIG. 16 is a block diagram showing a function of a control unit according to a fourth embodiment of the present disclosure.

In a fourth embodiment, as illustrated in FIG. 16, a control unit 31B of a vehicle-mounted device 3 includes an azimuth difference calculation unit 315 in addition to a channel control unit 311, an execution service determination unit 312, a transmission and reception data processing unit 313, and a distance calculation unit 314 included in the control unit 31 according to the third embodiment.

The azimuth difference calculation unit 315 calculates an azimuth from the vehicle-mounted device 3 toward a roadside device 2 that has transmitted the WSA based on the current position calculated by the GNSS receiver 33 and the position of the roadside device 2 represented by the roadside device position information included in the WSA. Further, a traveling azimuth of the vehicle-mounted device 3 is determined according to a movement locus of the vehicle-mounted device 3 determined by the current position of the vehicle-mounted device 3 sequentially calculated by the GNSS receiver 33. The azimuth difference between the azimuth of the roadside device 2 that has transmitted the WSA and the traveling azimuth of the vehicle-mounted device 3 is calculated. Herein, the azimuth of the roadside device 2 is determined using the traveling azimuth of the vehicle-mounted device 3 as a reference.

Figure 17:
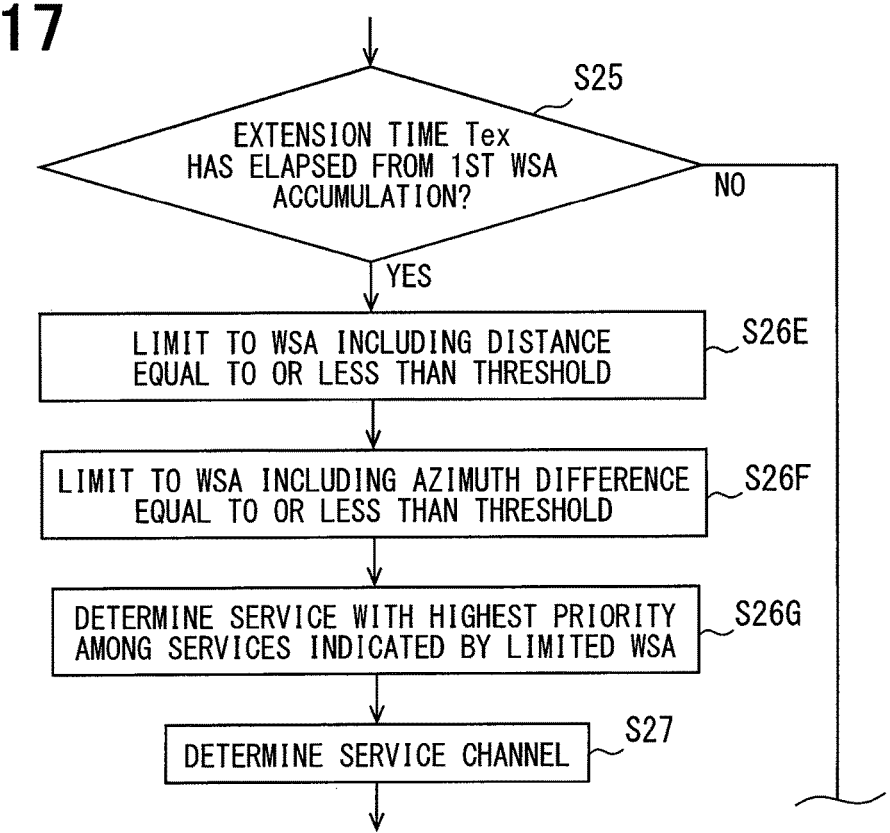
FIG. 17 is a flowchart showing a process to be executed by an execution service determination unit of the control unit according to the fourth embodiment.

In the fourth embodiment, the execution service determination unit 312 of the control unit 31B in the vehicle-mounted device 3 executes the processing shown in FIG. 17. In the processing shown in FIG. 17, Steps S26E, 526F, and S26G are executed in place of Step S26 in FIG. 9. The other processing is the same as in FIG. 9. In the fourth embodiment, Steps S26E, 526F, and S26G correspond to an execution service determination process.

Step S26E is identical with Step S26C in the third embodiment, and among the WSAs stored in the memory 31M, the WSA whose distance calculated by the distance calculation unit 314 is equal to or less than a threshold distance is selected.

In Step S26F, among the WSAs selected in Step S26E, the WSA whose azimuth difference calculated by the azimuth difference calculation unit 315 is equal to or less than a threshold azimuth difference is selected. The threshold azimuth difference is a threshold for limiting the roadside device 2 that has transmitted the WSA to the roadside device 2 existing in the traveling direction of the vehicle-mounted device 3, and is set in advance. The threshold azimuth difference is, for example, about 20 to 30 degrees.

In Step S26G, among the WSAs selected in Step S26F, the service with the highest priority of the service indicated by the WSA is determined. The service determined as the service with the highest priority is determined as the execution service.

In the fourth embodiment, with the execution of Step S26E, a target to be determined as the service with the highest priority is limited to a service represented by the WSA whose distance is equal to or less than a threshold distance among the WSAs stored in the memory 31M. As a result, when a service has a large communication distance that cannot ensure sufficient signal strength to perform data transmission and reception for executing the service, start of this kind of service can be prevented.

For the vehicle 4, important information during traveling is usually information on the traveling direction of the vehicle 4. Therefore, even if the priority included in the WSA is high, the service provided by the roadside device 2 not in the traveling direction is often not important. In the present embodiment, with the execution of Step S26F, a target to be determined as the service with the highest priority is limited to a service represented by the WSA whose azimuth difference is equal to or less than a threshold azimuth difference among the WSAs stored in the memory 31M. As a result, when the roadside device 2 provides the service which is not in the traveling direction, start of this kind of service is prevented. Thus, the vehicle 4 mounted with the vehicle-mounted device 3 can prevent a start of the service which is low in the importance.

Fifth Embodiment

Figure 18:
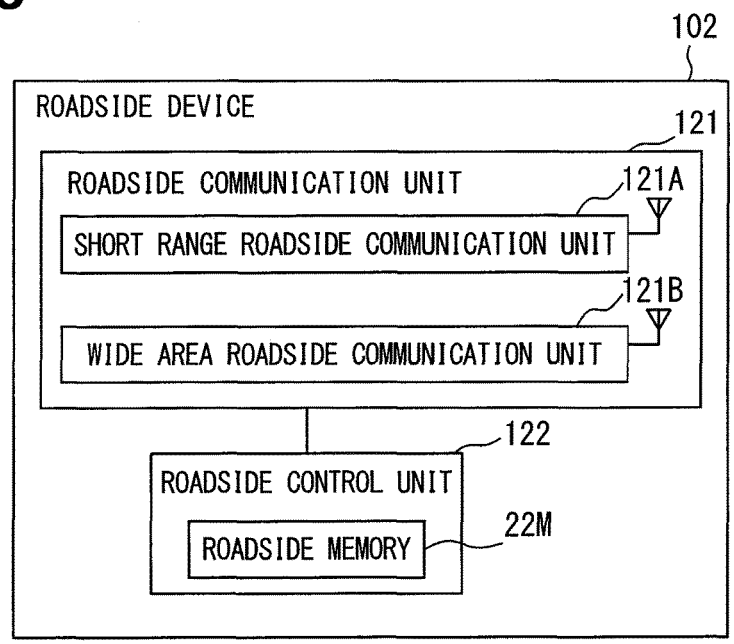
FIG. 18 is a block diagram showing a configuration of a roadside device according to a fifth embodiment of the present disclosure.

A roadside device 102 according to a fifth embodiment is configured as shown in FIG. 18. A roadside communication unit 121 includes a short range roadside communication unit 121A and a wide area roadside communication unit 121B. The short range roadside communication unit 121A is configured in the same manner as that of the roadside communication unit 21 in the first embodiment.

The wide area roadside communication unit 121B is a communication unit that performs a communication using a wide area communication network. The wide area communication network is a communication network that includes multiple relay stations and is used for a wireless phone call. It is needless to say that a frequency channel used by the wide area roadside communication unit 121B is a frequency channel in a frequency band different from the frequency channel used by the short range roadside communication unit 121A.

The roadside control unit 122 can transmit and receive service execution information with the selective use of the short range roadside communication unit 121A or the wide area roadside communication unit 121B included in the roadside communication unit 121.

Figure 19:
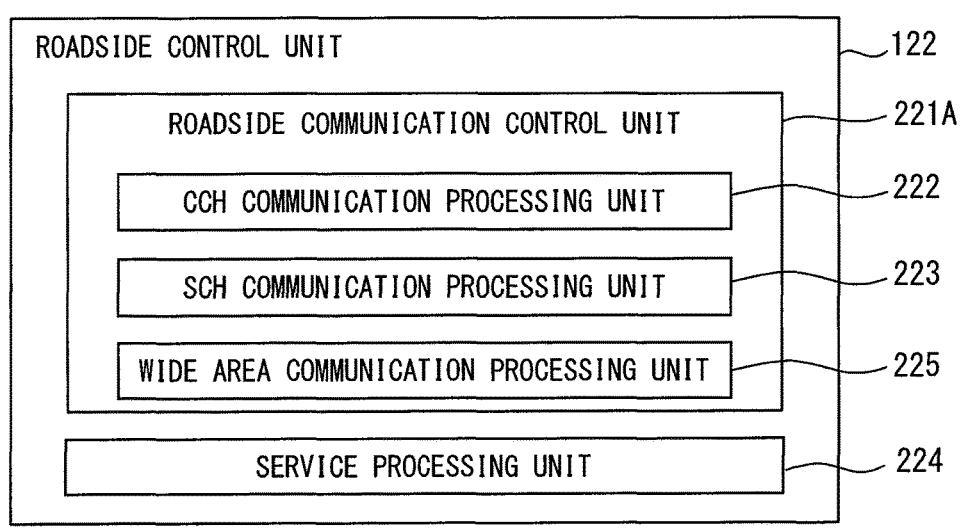
FIG. 19 is a block diagram showing a function of a roadside control unit according to the fifth embodiment.

As shown in FIG. 19, a roadside communication control unit 221A included in the roadside control unit 122 includes a wide area communication processing unit 225 in addition to a CCH communication processing unit 222 and an SCH communication processing unit 223.

Figures 20, 21:
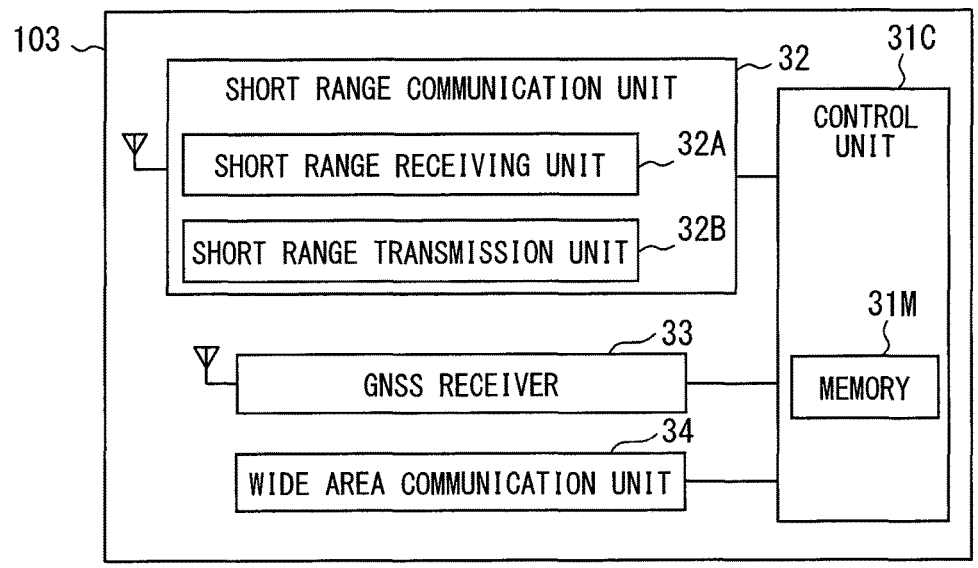
FIG. 20 is a diagram illustrating a WSA generated by a CCH communication processing unit in FIG. 19.
FIG. 21 is a block diagram showing a configuration of a vehicle-mounted device according to the fifth embodiment.

In the fifth embodiment, the CCH communication processing unit 222 generates a WSA shown in FIG. 20. The WSA shown in FIG. 20 is a data configuration in which a data size is added to the WSA of the first embodiment shown in FIG. 4. The data size indicates a data size to be required to be transmitted and received by the vehicle-mounted device 3 when the service determined by the WSA is executed, and the data size is an approximate data size.

For each service, the approximate data size to be transmitted to the vehicle-mounted device 3 by the roadside device 2, in other words, the approximate data size received by the vehicle-mounted device 3 is preliminarily determined. For each service, the approximate data size requested by the roadside device 2 for the vehicle-mounted device 3, in other words, the approximate data size transmitted by the vehicle-mounted device 3 is also determined. Therefore, the data size can be included in the WSA.

The wide area communication processing unit 225 complements the SCH communication processing unit 223. Specifically, the wide area communication processing unit 225 needs to communicate with the roadside device 2 for the purpose of executing the execution service determined by the execution service determination unit 312. However, if the vehicle-mounted device 3 is located outside of a communication area of the short range roadside communication unit 121A, the service execution information is transmitted and received to and from the vehicle-mounted device 3 with the use of the wide area roadside communication unit 121B.

The vehicle-mounted device 103 according to the fifth embodiment includes a wide area communication unit 34 as shown in FIG. 21. The wide area communication unit 34 is a communication unit that performs a communication using a wide area communication network. The other hardware configuration of the vehicle-mounted device 103 is the same as that of the first embodiment. Further, the function to be executed by the control unit 31C is different from that in the first embodiment.

Figure 22:
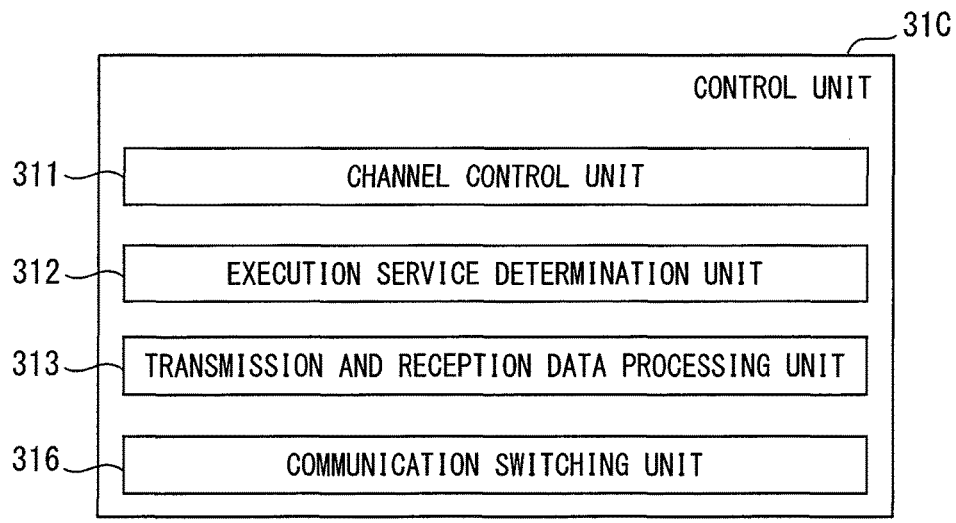
FIG. 22 is a block diagram showing a function of a control unit according to the fifth embodiment.

As shown in FIG. 22, the control unit 31C according to the fifth embodiment includes a communication switching unit 316 in addition to a channel control unit 311, an execution service determination unit 312, and a transmission and reception data processing unit 313 of the control unit 31 in the first embodiment.

The communication switching unit 316 switches the communication unit that transmits and receives the service execution information to the short range communication unit 32 or the wide area communication unit 34. Specifically, when the short range communication unit 32 can communicate with the short range roadside communication unit 121A of the roadside device 2, the short range communication unit 32 is used to transmit and receive the service execution information to and from the roadside device 2. Specifically, when the short range communication unit 32 cannot communicate with the short range roadside communication unit 121A of the roadside device 2, the wide area communication unit 34 is used to transmit and receive the service execution information to and from the roadside device 2.

The communication switching unit 316 transmits and receives the service execution information to and from the roadside device 2 with the use of the wide area communication unit 34 when the vehicle-mounted device 3 moves out of the communication area of the short range roadside communication unit 121A of the roadside device 102 during the execution of one service. For another example, the communication switching unit 316 transmits and receives the service execution information to and from the roadside device 2 with the use of the wide area communication unit 34 when the vehicle-mounted device 3 is positioned outside of the communication area of the short range roadside communication unit 121A of the roadside device 102 when the vehicle-mounted device 3 intends to start a communication with the roadside communication unit 121 of the roadside device 2 in order to start a certain service.

Figure 23:
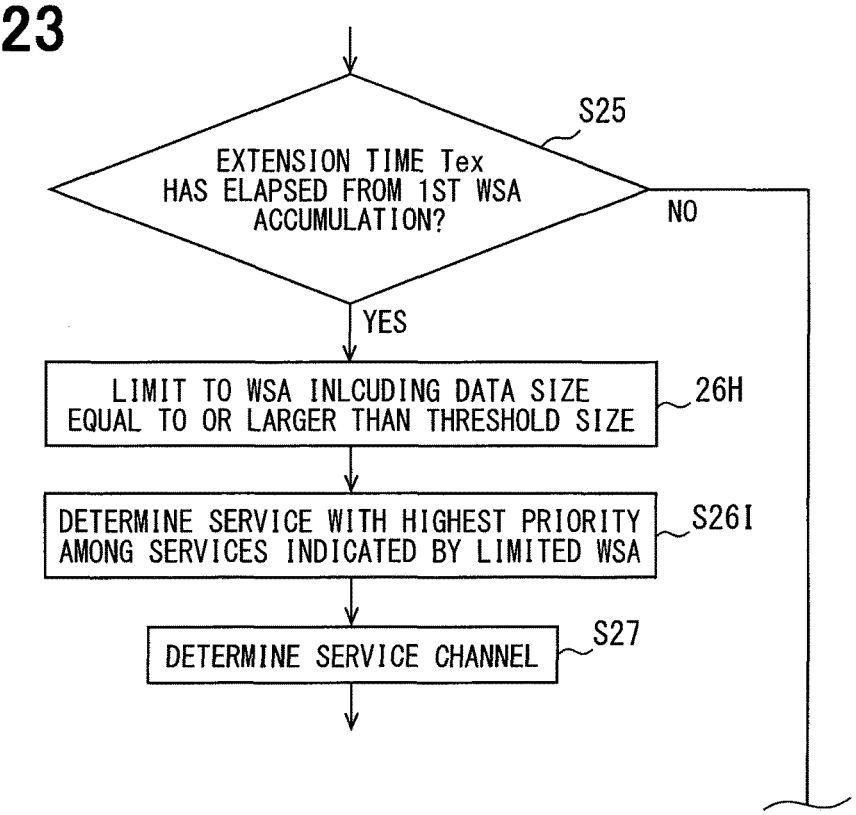
FIG. 23 is a flowchart showing a process to be executed by an execution service determination unit according to the fifth embodiment.

In the fifth embodiment, the execution service determination unit 312 of the control unit 31C executes the processing shown in FIG. 23. In the processing shown in FIG. 23, Steps S26H and S26I are executed in place of Step S26 in FIG. 9. The other processing is the same as in FIG. 9. In the fifth embodiment, Steps S26H and S26I correspond to an execution service determination process.

In Step S26H, the WSA whose data size is equal to or higher than a preset threshold size is selected from the WSAs stored in the memory 31M. In Step S26I, among the WSAs selected in Step S26H, the service with the highest priority of the service indicated by the WSA is determined. The service determined as the service with the highest priority is determined as the execution service.

In the fifth embodiment, with the execution of Step S26H, a target to be determined as the service with the highest priority is limited to a service represented by the WSA whose data size is equal to or more than a threshold size among the WSAs stored in the memory 31M. As a result, the service whose data size is equal to or more than the threshold size is preferentially executed by a communication using the service channel. In other words, the service whose data size is equal to or more than the threshold size is preferentially executed by a communication using the short range communication unit 32.

The communication with the use of the short range communication unit 32 generally does not generate communication fee whereas the communication with the use of the wide area communication unit 34 generally generates communication fees. Therefore, as in the fifth embodiment, if the service having the data size equal to or more than the threshold size is preferentially executed by the communication using the short range communication unit 32, although data transmission and reception using the wide area communication unit 34 generates the communication fees, the communication fees can be reduced.

The embodiments of the present disclosure have been described above. The present disclosure is not limited to the above-described embodiments, and the following modifications also fall within the technical scope of the present disclosure. Further, the present disclosure can be implemented with various changes without departing from the spirit of the present disclosure, aside from the following modifications.

First Modification

In the embodiments described above, only the WSA representing the execution service is deleted from the memory 31M in Step S27, and the execution service determination processing includes Step S22 shown in FIG. 9. Therefore, when the multiple WSAs are received while the reception channel of the short range receiving unit 32A is used as the control channel, the execution service determination process such as Step S26 is executed, to sequentially execute the received multiple WSAs as the execution service. The present disclosure is not limited to the above configuration, and when one execution service is determined, all of the WSAs stored in the memory 31M may be deleted.

Second Modification

In the fourth embodiment, the reception strength may be used instead of the distance. In this case, in the execution service determination process according to the fourth embodiment, Step S24A of the second embodiment is executed instead of Step S24, and Step S26A is executed instead of Step S26E.

Third Modification

The distance calculation unit 314 and Step S26E may not be provided in the fourth embodiment. In this case, the service with the highest priority among the services represented by the WSA with the azimuth difference equal to or less than the threshold azimuth difference is determined as the execution service without being limited by the distance.

Fourth Modification

In the embodiments described above, the vehicle-mounted device 3 is shown as an example of the wireless communication device. The wireless communication device is not required to be used in the vehicle. The wireless communication device may be used in a mobile object other than the vehicle. For example, a wireless communication device which is carried and used by a pedestrian may also correspond to the wireless communication device in the present disclosure.

Fifth Modification

In the embodiments described above, the roadside devices 2 and 102 are shown as an example of the service providing station. The service provision station is not limited to the roadside devices 2 and 102. The service providing station may be a terminal carried by a pedestrian. Although the roadside devices 2 and 102 may be of the movable type as described in the above embodiments, the movable type may be a mobile type that is mounted on a mobile object such as a vehicle, or may be of a mobile type, in other words, a portable type in which a position of the roadside device at the time of providing the service is fixed, and the roadside device is carried so as to change the installation position of the roadside device.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A wireless communication device comprising:
   a short range receiving unit that sets a reception channel to a channel selected from a control channel and a plurality of service channels, wherein the control channel and the plurality of service channels have different frequencies from each other, the short range receiving unit receives, from a service providing station, service start information while the reception channel is set to the control channel, the service start information includes information defining a type of a service, service priority information defining a priority of the service, and information defining a service channel of the service, the short range receiving unit receives, from the service providing station, service execution information which is information for execution of the service while the reception channel is set to the service channel;

a channel control unit that controls a setting of the reception channel to the control channel or to the service channel, wherein a time frame is divided alternately into a control channel time frame and a service channel time frame under a reference time division, the reception channel is set to the control channel during the control channel time frame and the reception channel is set to the service channel during the service channel time frame, the channel control unit sets the reception channel as the control channel during the control channel time frame, when the short range receiving unit receives the service start information related to a standard start service during the control channel time frame, the channel control unit maintains the reception channel as the control channel for an extension time frame after a reception of the service start information, the extension time frame is defined as a predetermined number of the service channel time frames, and the standard start service is a service which requires the reception channel is set to the service channel from a beginning of the service channel time frame; and an execution service determination unit that sets a part or all of the service start information received by the short range receiving unit as service start information for comparing priorities while the reception channel is set to the control channel, determines the service having a highest priority among the services indicated by the service start information for comparing priorities based on the service priority information included in the service start information, and performs an execution service determination process in which the service determined to have the highest priority is set as an execution service, wherein, when the execution service determination unit determines the standard start service as the execution service, the channel control unit sets the reception channel to the service channel according to the service start information of the execution service from a beginning of a next service channel time frame after the extension time frame has elapsed, and the execution service determination unit receives the service execution information using the service channel.

2. The wireless communication device according to claim 1, further comprising a reception strength determination unit that determines a reception strength of each service start information received by the wireless communication device, wherein, in the execution service determination process, the execution service determination unit determines, as the execution service, the service having the highest priority out of the services indicated by respective service start information each of which having the reception strength equal to or stronger than a threshold strength, and the service start information is received by the short range receiving unit while the reception channel is set as the control channel by the channel control unit.

3. The wireless communication device according to claim 1, wherein the service start information includes position information indicating a position of the service providing station that transmits the service start information, the wireless communication device further comprises:

a position detection unit that sequentially detects a current position of the wireless communication device; and a distance calculation unit that calculates a distance between the service providing station which transmits the service start information and the wireless communication device for each service start information based on the current position detected by the position detection unit and the position information of the service providing station included in the service start information, in the execution service determination process, the execution service determination unit determines, as the execution service, the service having the highest priority out of the services indicated by the respective service start information, the distance calculated by the distance calculation unit for each service start information is referred to as the distance of the service, and each of the services from which the execution service is determined has the distance equal to or less than a threshold distance, and the service start information is received by the short range receiving unit while the reception channel is set as the control channel by the channel control unit.

4. The wireless communication device according to claim 1, wherein the service start information includes position information indicating a position of the service providing station that transmits the service start information, the wireless communication device further comprises:

a position detection unit that sequentially detects a current position of the wireless communication device; and an azimuth difference calculation unit that calculates an azimuth difference between an azimuth of the service providing station which transmits the service start information and a traveling azimuth of the wireless communication device based on the current position detected by the position detection unit and the position information of the service providing station included in the service start information, the azimuth of the service providing station is determined using the traveling azimuth of the wireless communication device as a reference, in the execution service determination process, the execution service determination unit determines, as the execution service, the service having the highest priority out of the services indicated by the respective service start information, the azimuth difference calculated by the azimuth difference calculation unit for each service start information is referred to as the azimuth difference of the service, and each of the services from which the execution service is determined has the azimuth difference equal to or less than a threshold azimuth difference, and the service start information is received by the short range receiving unit while the reception channel is set as the control channel by the channel control unit.

5. The wireless communication device according to claim 2, wherein the service start information includes position information indicating a position of the service providing station that transmits the service start information, the wireless communication device further comprises:

a position detection unit that sequentially detects a current position of the wireless communication device; and an azimuth difference calculation unit that calculates an azimuth difference between an azimuth of the service providing station which transmits the service start information and a traveling azimuth of the wireless communication device based on the current position detected by the position detection unit and the position information of the service providing station included in the service start information, the azimuth of the service providing station is determined using the traveling azimuth of the wireless communication device as a reference, in the execution service determination process, the execution service determination unit determines, as the execution service, the service having the highest priority out of the services indicated by the respective service start information, the azimuth difference calculated by the azimuth difference calculation unit for each service start information is referred to as the azimuth difference of the service, and each of the services from which the execution service is determined has the reception strength equal to or stronger than the threshold strength and has the azimuth difference equal to or less than a threshold azimuth difference, and the service start information is received by the short range receiving unit while the reception channel is set as the control channel by the channel control unit.

6. The wireless communication device according to claim 3, further comprising an azimuth difference calculation unit that calculates an azimuth difference between an azimuth of the service providing station which transmits the service start information and a traveling azimuth of the wireless communication device based on the current position detected by the position detection unit and the position information of the service providing station included in the service start information, the azimuth of the service providing station is determined using the traveling azimuth of the wireless communication device as a reference, wherein, in the execution service determination process, the execution service determination unit determines, as the execution service, the service having the highest priority out of the services indicated by the respective service start information, the azimuth difference calculated by the azimuth difference calculation unit for each service start information is referred to as the azimuth difference of the service, and each of the services from which the execution service is determined has the distance equal to or less than the threshold distance and has the azimuth difference equal to or less than a threshold azimuth difference, and the service start information is received by the short range receiving unit while the reception channel is set as the control channel by the channel control unit.

7. The wireless communication device according to claim 1, wherein the service execution information includes information transmitted from the service providing station and information transmitted from the wireless communication device, the service providing station is capable of transmitting and receiving the service execution information via a short range communication and is capable of transmitting and receiving the service execution information via a wide area communication network, the service start information includes information indicating a data size required to be transmitted and received by the wireless communication device for executing the service, in the execution service determination process, the execution service determination unit determines, as the execution service, the service having the highest priority out of the services indicated by the respective service start information, each of the services from which the execution service is determined has the data size equal to or greater than a threshold size, the service start information is received by the short range receiving unit while the reception channel is set as the control channel by the channel control unit, and the wireless communication device further comprises:

a short range transmission unit that performs a short range transmission;

a wide area communication unit that performs a communication using a wide area communication network; and a communication switching unit that transmits and receives the service execution information to and from the service providing station with the use of the short range receiving unit and the short range transmission unit when the short range receiving unit and the short range transmission unit are capable of communicating with the service providing station, and transmits and receives the service execution information to and from the service providing station with the use of the wide area communication unit when the short range receiving unit and the short range transmission unit are incapable of communicating with the service providing station.

8. The wireless communication device according to claim 1, further comprising a storage unit that stores the service start information received while the reception channel is set as the control channel by the channel control unit, wherein the execution service determination unit performs the execution service determination process with the service related to the service start information which has not yet been executed out of the service start information stored in the storage unit as a target service, and determines the execution service.

9. The wireless communication device according to claim 1, wherein the service start information includes an immediate start instruction for instructing the channel control unit to set the reception channel as the service channel immediately upon receiving of the service start information, the execution service determination unit determines whether each service start information that is received includes the immediate start instruction while the reception channel is set as the control channel, and sets the execution service as the service determined by the service start information including the immediate start instruction when determining that the service start information includes the immediate start instruction, and when the execution service determination unit determines, as the execution service, the service corresponding to the service start information including the immediate start instruction, the channel control unit sets the reception channel to the service channel immediately after the execution service determination unit determines the execution service.

* * * * *